Aug. 18, 1970  AKIRA KAWAJI  3,525,024
INJECTION LASER ADDER ELEMENT
Filed May 16, 1968  2 Sheets-Sheet 1
| INPUT | OUTPUT | CARRY SIGNAL |
|---|---|---|
| A  B | S | $C_o$ |
| 0  0 | 0 | 0 |
| 1  0 | 1 | 0 |
| 0  1 | 1 | 0 |
| 1  1 | 0 | 1 |
FIG. 1
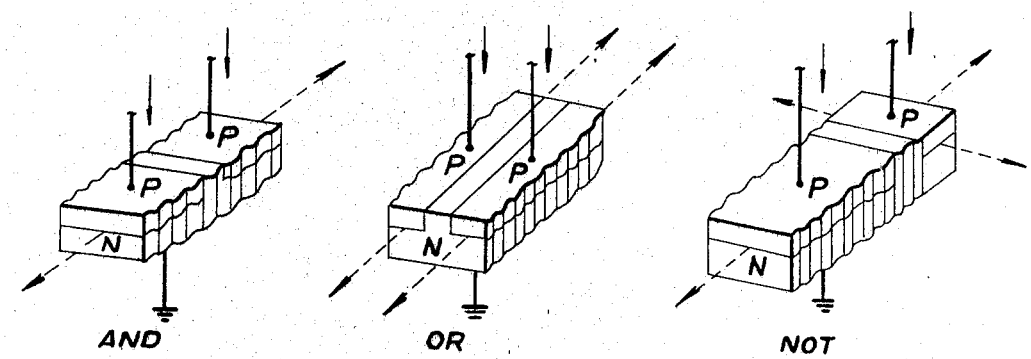
FIG. 1A  FIG. 1B  FIG. 1C
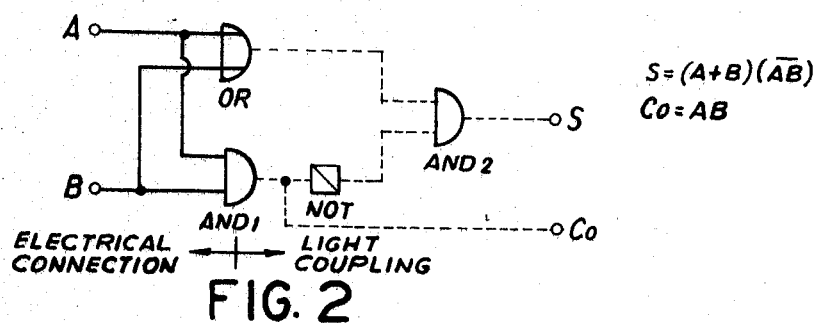
$S = (A+B)(\overline{AB})$
$C_o = AB$
FIG. 2
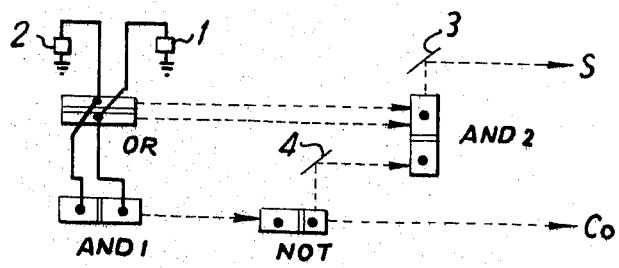
FIG. 3
INVENTOR.
AKIRA KAWAJI
BY
Hopgood & Calimafde
ATTORNEYS Aug. 18, 1970 AKIRA KAWAJI 3,525,024
INJECTION LASER ADDER ELEMENT
Filed May 16, 1968 2 Sheets-Sheet 2

INVENTOR.
AKIRA KAWAJI
BY
Hopgood & Calimafde
ATTORNEYS

United States Patent Office 3,525,024
Patented Aug. 18, 1970

3,525,024
INJECTION LASER ADDER ELEMENT
Akira Kawaji, % Nippon Electric Company, Limited,
7–15 Shiba Gochome, Minato-ku, Tokyo, Japan
Filed May 16, 1968, Ser. No. 731,360
Claims priority, application Japan, May 23, 1967,
42/32,710
Int. Cl. H01l *15/00*
U.S. Cl. 317—234                                11 Claims

ABSTRACT OF THE DISCLOSURE

A device is described for providing a logical half adder function using few optical injection laser elements (as low as five) by incorporating the quenching effect that quenches a laser produced between elements by subjecting the latter elements to a laser action that is transverse thereto. The regions of an injection laser semiconductor junction are arranged in parallel rows with selected regions between rows in lasing relationship and the regions of one row in lasing relationship with one another. Currents representative of signals to be added are selectively applied to the regions and a biasing current is applied to set the operating threshold in such manner that lasing in one direction occurs representative of the sum and lasing in the other direction occurs representative of the carry ouptut of the optical half adder.

This invention relates to a semiconductor laser element operating as a logical adder circuit.

Up to now, a certain number of laser logical elements have been known. Namely, by applying a non-uniform distribution of current density to an injection laser, two laser lights are emitted in different directions, and by changing the current density distribution, the two emitted lights change in their intensity relative to each other. In another operation, one of the laser lights may be extinguished and the other strongly emitted. Refer, for instance, to E. C. Kelly's paper published in the Proceedings of the IEE, Electron Device, vol. 2, January 1965, page 1. The last-mentioned operation involves an application of the quenching phenomenon of laser oscillation, and by applying such operation to a laser element in a logical operation circuit, the element can be used as an inverter, that is, a NOT element.

In another well-known paper published in the Japan Journal of Applied Physics, vol. 3, July 1964, page 425, it is shown that, in an element having two p-type regions in an n-type substrate and wherein currents of different current density are made to flow through the respective p-type regions, a laser light output in the direction crossing both junctions is emitted along the junction only when certain definite currents are made to flow simultaneously through both junctions, but the laser light is not emitted when only one of the currents flows. The circuit, when accompanied with an excitation signal evidently behaves in a logical manner such as an AND gate used in a digital logic circuit. Furthermore, to form a logical sum, i.e. an OR gate, this may be done by arranging two or more lasers in parallel.

An advantage of these laser logical elements resides in the fact that the response times of the conversion from the electric signal to the light output and from the light input to the light output of the semiconductor injection laser are theoretically between $10^{-21}$–$10^{-11}$ seconds and the actual experimental response times are below $0.2\mu$ second. Consequently, the formation of an extra-high-speed light-coupled logical circuit becomes possible. Since the coupling for transferring the signals between elements is of the light-coupling type, both the reactance effect of the connecting wires and the bad influence of the counter-coupling are eliminated so that it is possible to set up a logical operation circuit performing its operation far more rapidly than a conventional electronic circuit. With such advantantageous laser logical elements, therefore, it is desired to obtain some other operational elements than the above-mentioned known ones, e.g. an element having the function of an adder.

It is therefore the main object of this invention to provide an extra-high-speed light-coupled adder element.

FIGS. 1a through 1c are perspective views of various injection laser logical elements according to prior art techniques;

FIG. 2 is an adder circuit diagram;

FIG. 3 is a schematic view of a laser adder using external light coupling;

Figure 4:
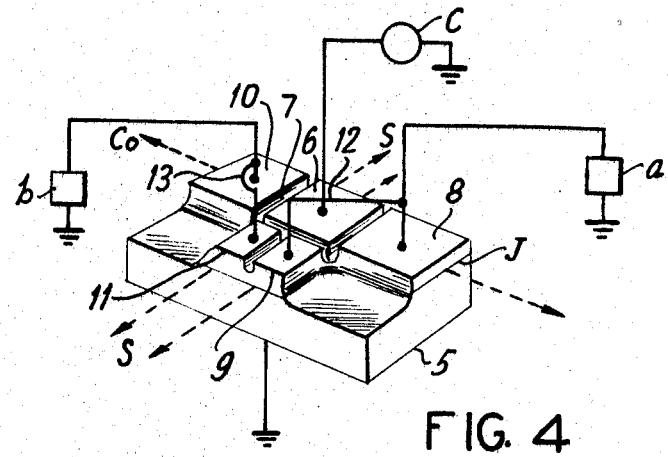
FIG. 4 is a perspective view of a typical embodiment of the injection laser adder element according to the present invention.

The fundamental logical circuit for performing the adder function by the combination of well-known logical elements is first considered. A laser adder circuit may be formed with reference to a conventional electronic circuit. A digital logical circuit is essentially composed of an AND gate, an OR gate and a NOT circuit, i.e. an inverter that inverts the functional outputs from the gates. Since the semiconductor injection laser is capable of forming any of these elements as described previously, the adder function can be performed by combining the said laser elements. In using a laser, however, the logic information is carried by light which is generally used for direct coupling of the laser elements with each other. Thus, the adder may be formed, for example, by arranging laser elements in series where the laser output in one stage is an input to a following stage, whereby a final laser output represents the adder output.

Since the light-emitting region of an injection laser is concentrated in a narrow area of the junction, an extremely difficult problem is encountered in obtaining external light coupling between two laser elements. The effectiveness of light coupling will be markedly lowered, unless the input light is concentrated onto a narrow active region later which, for a gallium arsenide laser, has a thickness of about $2\mu$. Furthermore, it is known that coherent light coming from such a narrow region is emitted at an opening angle of about 10° by diffraction. Therefore, the superimposition of these two counter-acting effects makes it impossible to bring about the direct external light coupling. It was hitherto attempted to achieve light coupling without the light loss between the lasers by inserting a lens system or a light-guiding member such as an optical fiber. However, the introduction of such a system is almost ineffective and adds complexity and renders it difficult to integrate an adder into a single element. To achieve the extra-high-speed logical operation by use of a laser, it is desirable that the logic operation be performed preferably in the vicinity of the light-emitting mode of the injection laser to avoid signal delays. This may be explained as follows.

In the case of a flowing electric current through the injection laser, a spurious and spontaneous emission of light occurs even when the current density does not reach the threshold value of coherent laser oscillation. The time for changing the coherent laser emission state from the spurious state is known to have a time-constant of about $2 \times 10^{-9}$ seconds, which is considerably larger than the theoretical time-constant of $10^{-11}$–$10^{-12}$ seconds applicable when the current exceeds the threshold value and the laser is in the oscillating state. Consequently, the rise of coherent laser light emission will be delayed until the current density reaches the threshold value.

To prevent such a delay, the following two methods may be considered. A first method is based on using a large amplitude signal current since it is well known that the rise time of a signal may be improved upon amplification. The use of a large current signal will produce an output light signal of large amplitude when the signal current exceeds the threshold current by several times its value. Unfortunately, the speed of the laser signal is obtained at low light amplitudes so that the large current signal method is incompatible with the desire to obtain a high speed circuit.

The second method consists of keeping the laser in a state just before the start of light oscillation by biasing through a suitable means, then adding the input signal with the laser in the above state to produce the stimulated emission over the whole of the range of signal current, and enabling the device to enter into the oscillating state. In this case even if the signal level is low, high-speed operation will be possible, provided the biased point is adequate. Then an essential question arises as to how an adequate bias is determined.

In the present invention, I use a method in which the light coming from a p-n junction adjacent the junction to be biased excites the latter junction, thereby the distribution of electrons in the vicinity of the latter p-n junction is changed to establish a junction state just before coherent light oscillation starts. It is known that the light of spontaneous emission from a junction where more electric current is flowing is a light of shorter wavelength and contains large energy photons, as compared with the spontaneous emission from a junction where less electric current passes. When a light of larger energy is incident on a light emission mechanism of less energy, a pumping action takes place to lower the threshold current value for generating the oscillation in that lower energy mechanism.

In this invention, one or more bias electrodes are provided and a current is preliminarily passed through the p-n junction or junctions for biasing, so that the light emitted from the biasing junction(s) may give a pumping action to the junction(s) where no current is passing, thus maintaining the element as a whole in the state just before oscillation. As a result, the element begins oscillation immediately after receiving an input signal current without any delay.

The present invention contemplates a structure of a laser element composed of a single base plate capable of performing the function of an adder efficiently without the difficulties mentioned above. In this invention, an internal coupling system is used in the structure of an adder to obtain high efficiency light coupling in the interior of the element instead of inefficient external coupling by light, thus obtaining an element working as an adder with only one base plate semiconductor and at least one p-n junction. In the simplest construction, five electrodes are provided to the structure which produces oscillation in two directions. In order that a predetermined laser output may be obtained when current is passed simultaneously through two junction portions (to present a carry signal), the interval of the reflecting surfaces is selected so as to impart certain differences in the ease of resonance of two transverse lasing modes, and bias electrodes are provided for setting a predetermined working point so as to provide a stable high-speed operation.

The internal light coupling uses a laser light oscillating in an element with several coplanar laser light coupled junction portions connected to several electrodes. By changing the density of current flowing through a certain junction portion which is in common lasing relationship with other coplanar elements it is possible to control the laser oscillation of other junction portions. This has been applied up to now only to elements of simple structure having merely two electrodes, such as the logical AND and OR elements mentioned before. With internal light coupling the signal is controlled and the dispersion of light flux is not a problem. Considered dimensionally, internal coupling with a coupling distance between two domains of smaller than 100 microns, an efficiency of nearly 100% is attained provided the active regions have a common junction.

In order to apply the above to the construction of the adder mechanism mentioned previously, there is needed a special multi-electrode structure based on the described performance principle for the injection laser. Namely, as is clear from FIG. 2, in the construction of a half-adder, both the emitted light representing the output sum and the output light representing the carry signal must satisfy the conditions set forth in Table 1. For this purpose, it is necessary to construct on one base plate devices corresponding to those shown in FIG. 2, i.e., two AND elements, one OR and one NOT element, and further it is desirable that the unit is constructed with one common junction.

It is, however, impossible from the point of geometrical arrangement to arrange on a single base plate all the constituent elements of FIG. 2. The present invention provides an effective means to attain the above half-adder function, and solves this problem by considering the simplification possible by the compounding of electrodes. Concretely speaking, it has been clarified that the element indicated by $AND_2$ in FIG. 2 could be dispensed with, to make an element that displays entirely perfect adder function, by using the quenching effect of lasers and by the control of the threshold value of current density due to the setting-up of selected dimensions of the element. The experimentally made half-adder has such an apparent structure that it seemingly uses but one AND element and one OR element on one semiconductor base plate. However, from the functional point of view, the element includes the not action by quenching, and the dimensions of the resonance structure is set up in such a manner that, with respect to the threshold values in current density above which lasing action arises for the OR part and the AND part, the former is larger than the latter. Moreover, it has been confirmed that, by providing common electrodes between the both parts, the function of $AND_2$ element in FIG. 2 can be obtained.

For instance, FIG. 3 which will be later described in detail shows the case where the logical elements are externally coupled by light individually, and necessntates 8 p-type regions in total, whereas, according to the present invention, the same function can be achieved by only arranging 5 p-type regions on one base plate. Furthermore, instead of using a plural number of the p–n junctions, a single common junction suffices provided the grooves' depths separating the regions terminate short of the junction plane but penetrate sufficiently into the p-region to divide the p-region into electrical regions effectively separated by the high electric resistance presented by the narrow p-type portion located between the bottom of the grooves and the junction plane.

The injection laser element of this invention is characterized in that on the base plate composed of a direct-type semiconductor material is formed a layer of the opposite conductivity type with at least one p–n junction as boundary, with not less than four lateral faces thereof containing the reflection surfaces. Opposite conductivity type layer is divided electrically into at least five regions, which are arranged at least in two rows intersecting with each other on the base plate. The regions at both ends of each row being in contact with reflecting surfaces respectively. A constant electric current is applied during the working period between the base plate and the region or regions located at the intersection of the rows of the opposite conductivity type regions, and two sets of regions not located at the intersection and belonging to different rows are respectively connected electrically with the input signals being applied to each of these two sets of regions.

Here, the direct-type semiconductor signifies a semiconductor such as GaAs in which the bottom of the conduction band and the top of the valence band are face to face without dislocation. In order to form the electrically divided regions, a part of opposite conductive type is so formed as to have one p–n junction with the base plate, followed by providing grooves not reaching the p–n junction in that part so as to partition each region. Alternatively, a plural number of such p–n junctions wherein the bottom surfaces are on the same plane are formed in a base plate to provide a plural number of regions which are separated from the base plate by the p–n junctions. The intervals between regions are preferably less than 100 microns.

Next, this invention will be explained referring to the drawings. The above-mentioned AND, OR, NOT elements as the conventional logical circuit elements are respectively shown in FIG. 1A, FIG. 1B and FIG. 1C. In these figures, the broken line arrows indicate the radiating directions of laser lights, while the full line arrows indicate the directions of current. In the case of forming an adder circuit by use of the logical elements of FIG. 1 with external light coupling, the adder circuit is made up in such a manner as shown in FIG. 2 with the arrangement of each element as given by FIG. 3. In FIG. 2, A and B represent the inputs, S the adder output, and $Co$ the carry signal output. As is well known, the logic values of this adder is as shown in Table 1. In FIG. 3, 1 and 2 are the input pulse signal sources, and 3 and 4 are the reflecting mirrors. Since the construction of FIG. 3 utilizes external light coupling, the serious difficulties mentioned before arise. The present invention offers a means of elementalization without such difficulties.

The embodiment of the present invention as shown in FIG. 4 will now be explained. In this figure, the numeral 5 is the base plate of, for example, n-type, which is composed of a direct-type semiconductor crystal. J is the p–n junction and the upped part partitioned by J is of p-type. The numeral 7 represents a series of grooves $20\mu$ wide which is cut by a selective etching process and which divides the p-type part into several p-regions with the aid of a high-resistance portion. The unnecessary p-regions, i.e., the hatched parts in the figure, have been removed by etching together at the same time when the junction portion 7 is etched and their surfaces form a rough non-reflecting surface. The input signal sources are represented by the letters $a$ and $b$, while the letter $c$ is the bias source connected to the p-region 6. In FIG. 4, the broken line arrows also indicate the radiating directions of the laser lights. The plural p-regions may be made by the selective diffusion process, and in such case, several junctions are formed of equal number to that of the p-regions. In either case, high efficiency is maintained because the widening of the light flux does not occur.

The p-regions 8 and 9 and the p-regions 10 and 11 are respectively connected by the conductors 12 and 13 with lead-out electrodes taken out from the conductors 12, 13 and the p-region 6, respectively. The back surface of this element is soldered to a metallic heat-radiating plate through an ohmic connecting electrode (not shown). In case the input electric signals are applied simultaneously from the input signal sources $a$ and $b$, it is required in accordance with the logic values of Table 1 that only the oscillation in the direction of $Co$ takes place but not in the S direction. For this purpose, the output of S shall be quenched by the oscillating mode operative in the $Co$ direction.

Speaking generally, light emission by the process of recombination of light radiation occurs when a source of light having an energy larger than the value required for light emission is applied; such is also the case for the semiconductor laser. Quenching, however, is a reverse phenomenon wherein light emission by excitation is suppressed. Quenching arises when the energy of the incident light is lower than the light energy necessary for sustaining the laser oscillating action. Furthermore, the wavelength of the emitted light due to the semiconductor recombination radiation becomes shorter with the increase of the amount of carriers injected, namely, with the increase of current density, and it is inferred that, in the case of a laser, the magnitude of the threshold current density corresponds to that of the photon energy of the laser light. On the other hand, it is well known that the threshold value becomes larger because of the increase of the penetration loss when the interval of the reflecting surfaces of the resonance structure is made narrow. Therefore, it is understood that, in order to quench the oscillation in the S direction by the oscillation in the $Co$ direction, it is convenient to make the length of the element in the $Co$ direction larger than that in the S direction.

The element actually made has a length of $625\mu$ in the $Co$ direction, a length of $345\mu$ in the S direction, and a thickness of the p-type part (i.e., p-regions) of $18\mu$. The p-type part was made by the vapor phase diffusion of zinc. The separation resistance between the adjacent p-regions divided by the grooves is about $3\Omega$ which is sufficiently large as compared with the working resistance, about $0.1\Omega$ of the junction, so there was no problem about the branching of current. This element was mounted on a copper header and tightly attached on the cooling plate of a cooler. It was confirmed that this laser works continuously when the whole element was kept at about 18° K. by means of the cooler. It was also confirmed that, by applying at first a D.C. current of about 80 ma. to the bias electrodes and then supplying the signal currents each of 60 ma. from the signal sources as D.C. current or pulse current inputs, all of the elements manufactured oscillated, corresponding to the inputs, in the S and $Co$ directions shown in FIG. 4 in such a manner as to satisfy the logic values listed in Table 1. The response speed was measured by use of a high speed avalanche photodiode, with a result of the time constant less than $2 \times 10^{-9}$ sec.

Figure 5:
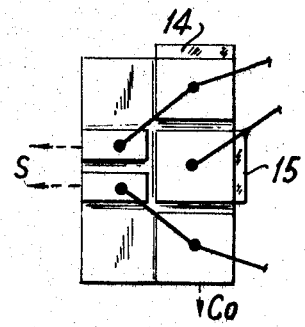
FIGS. 5, 6a through 6c and 7 are plan views of other embodiments of this invention.
Figure 6A:
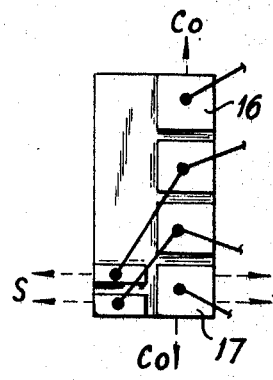
Figure 6B:
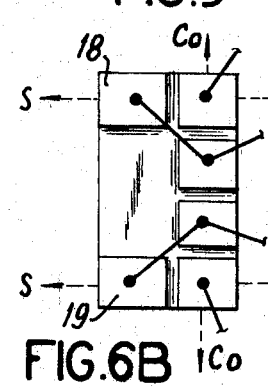
Figure 6C:
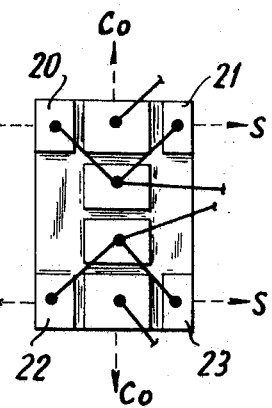
Figure 7:
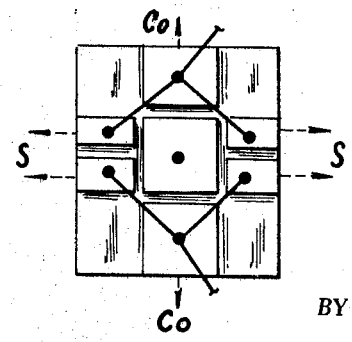

Next, another embodiment of this invention will be explained. FIG. 5 shows the plan view of a laser element in which reflecting films 14 and 15 are provided to the laser element of the above embodiment to make each of the light signal outputs of S and $Co$ radiate strongly in only one direction and hence to simplify the detection of the light signal outputs. FIG. 6 shows an embodiment for lengthening particularly the interval between the reflecting surfaces in the $Co$ direction, in which the laser element includes two p-type regions connected with the bias electrodes as shown by 16 and 17 in FIG. 6A. In such a structure, the p-regions corresponding to the OR structure of FIG. 4, i.e., the p-regions 9, 11, can be arranged separately as shown by 18, 19 in FIG. 6B, and since these regions are separated there is no mutual coupling between them, and thus facilitating the design. FIG. 6C gives an example of the symmetrical structure in which the OR structure is divided into 20, 21 and 22, 23 on both sides respectively. This principle may be realized also in the case of FIG. 4 by dividing the OR part on both sides as shown in FIG. 7, but it is better to follow FIG. 6C because it is easier to manufacture. It is possible to obtain the desired operation even when the base plate is of a square form as shown in FIG. 7, because the number of grooves or of n-type layers to be inserted to separate the p-type regions are the same in the Co direction as in the S direction. It goes without saying, however, that the rectangular form as shown in FIG. 6C is desirable in the enhancement of yield. As stated above, the structure of the injection laser adder element of this invention is able to be modified as dictated by necessity.

The above is an explanation of the present invention; however, the patent right of the patent for this invention is inclusive of all the injection laser adder elements described in the following claims.

I claim:

1. An injection laser adder element comprising a base plate of a first conductivity type composed of a direct-type semiconductor material and a layer of opposite conductivity forming a p-n junction with the base with not less than four of the lateral faces of the junction being reflecting surfaces, said layer being electrically divided into at least five regions arranged in at least two rows intersecting each other on the base material, the regions at both ends of each row being in contact with reflecting surfaces, means applying between the base and a region located at the intersection of the rows of said opposite conductivity type region a constant electric biasing current, and means for applying to two sets of regions not located at the intersection and belonging to different rows input signals representative of signals to be added.

2. An injection laser adder element comprising
a semiconductor injection laser device providing from optical reflecting surfaces directionally distinct laser beams individually representative of the optical sum and optical carry outputs of a logical half adder,
said device including a semiconductor layer of a first conductivity type divided into first and second substantially parallel rows of resistively separate regions with the regions in the first row in optical lasing relationship and a common region in the first row in optical relationship with a selected region in the second row,
first means for applying a current representative of a first signal to be added to a first pair of regions, each located in separate rows and in non-lasing relationship with one another,
second means for applying a current representative of a second signal to be added to a second pair of regions, each located in separate rows and in non-lasing relationship with one another, and
means for applying a biasing current to said common region with said biasing current being selected at a value for producing an optical lasing sum representing a beam between said common region and the selected region in response to a current from either one of said first and second means and for producing an optical carry representing lasing beam between the regions in the first row to quench said sum lasing beam upon the occurrence of current from both said first and second means.

3. An injection laser adder element comprising
a semiconductor injection laser device providing from optical reflecting surfaces substantially transverse laser beams respectively representative of the optical sum and carry outputs of a logical half adder,
said laser device including
a rectangular base of a material of a first conductivity type and a layer of material of a second opposite conductivity type forming a planar junction with said base, said layer being divided into a plurality of resistively separated regions arranged in parallel rows with a first row including at least three regions and the other second parallel row including at least two regions each in lasing relationship with a common region in said first row, first means for applying an electrical current representative of a first signal to be added to a first of the regions in the other second parallel row and a first region in the first row other than said common region,
second means for applying an electrical current representative of a second signal to be added to a second of the regions in the other second parallel row and a second region in the first row other than said common region, and
means for biasing said common region with a current density selected to provide first lasing action between regions of the first and second rows in response to current from either one of said first and second means and to provide second lasing action between regions in the first row with quenching of the first lasing action in response to current from both said first and second means.

4. The device as recited in claim 3 wherein said first row includes four regions having two common regions, each one being in lasing relationship with a region in the other second parallel row and with the two common regions being placed at end locations of the first row and with the current from the biasing means being applied to both said common regions.

5. A semiconductor laser element for obtaining a logical adder function comprising:
a semiconductor junction formed of a first semiconductor base of a first conductivity type and a second semiconductor layer of a second opposite conductivity type located in junction forming relationship with the base and divided into five resistively separated regions arranged in parallel rows with two regions in one row and three regions in the other row and with said two regions in lasing relationship with a selected region in the other row and with said three regions in the other row in lasing relationship with one another.

6. A semiconductor laser element for obtaining a logical adder function therewith comprising:
a semiconductor laser junction formed of a first semiconductor base of a first conductivity type and a second semiconductor layer of a second opposite conductivity type located in junction forming relationship with the base and divided into five resistively separated regions selectively arranged to provide a half adder function.

7. A semiconductor laser element for obtaining a logical adder function therewith comprising:
a semiconductor laser junction formed of a first semiconductor base of a first conductivity type and a second semiconductor layer of a second opposite conductivity type located in junction forming relationship with the base and divided into six resistively separated regions selectively arranged to provide a half adder function.

8. The device as recited in claim 7 wherein the regions are arranged in parallel rows containing two and four regions respectively with said four regions in lasing relationship with one another and each of said two regions being in lasing relationship with a region in the row containing four regions.

9. The device as recited in claim 8 wherein the two regions are spaced from one another and are in lasing relationship with end-located regions of said four-region-containing row.

10. A semiconductor laser element for obtaining a logical adder function therewith comprising:
a semiconductor laser junction formed of a first semiconductor base of a first conductivity type and a second semiconductor layer of a second opposite conductivity type located in junction forming relationship with the base and divided into seven resistively separated regions selectively arranged to provide a half adder function.

11. The device as recited in claim 10 wherein the base and layer are square shaped and the regions arranged in a pair of transverse crossing rows, one row including five regions and the other row having three regions, with the regions within each row in lasing relationship.

References Cited

UNITED STATES PATENTS

| | | | |
|---|---|---|---|
| 3,303,431 | 2/1967 | Fowler | 331—94.5 |
| 3,436,679 | 4/1969 | Fenner | 331—94.5 |
| 3,239,688 | 3/1966 | Price | 307—88.5 |

OTHER REFERENCES

Kelley: I.B.M. Technical Disclosure Bulletin, vol. 7, No. 11, April 1965, p. 1073.

Williams et al.: I.B.M. Technical Disclosure Bulletin, vol. 7, No. 9, February 1965, pp. 803–804.

Marinall et al.: I.B.M. Technical Disclosure Bulletin, vol. 7, No. 4, September 1965, p. 336.

JOHN W. HUCKERT, Primary Examiner

M. H. EDLOW, Assistant Examiner

U.S. Cl. X.R.

307—312; 331—94.5